US012277482B2

(12) United States Patent
Muthuswamy et al.

(10) Patent No.: US 12,277,482 B2
(45) Date of Patent: Apr. 15, 2025

(54) COGNITIVE CLAIMS PROCESSING

(71) Applicant: International Business Machines Corporation, Armonk, NY (US)

(72) Inventors: Srinivasan S. Muthuswamy, Bangalore (IN); Mukesh Kumar, Bangalore (IN); Willie Robert Patten, Jr., Hurdle Mills, NC (US); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 17/209,568

(22) Filed: Mar. 23, 2021

(65) Prior Publication Data

US 2022/0309380 A1 Sep. 29, 2022

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| | | | | |
|---|---|---|---|---|
| 7,984,053 | B2 | 7/2011 | Jackson | |
| 9,904,928 | B1 * | 2/2018 | Leise | G06Q 30/0185 |
| 10,586,280 | B2 * | 3/2020 | McKenna | G06N 20/00 |
| 10,628,834 | B1 * | 4/2020 | Agarwal | G16H 10/60 |
| 10,679,293 | B2 | 6/2020 | Zarate | |
| 10,832,248 | B1 * | 11/2020 | Kramme | G06Q 20/3224 |
| 10,937,108 | B1 * | 3/2021 | Tabak | G06N 3/045 |
| 10,949,854 | B1 * | 3/2021 | Kramme | G06Q 20/407 |
| 11,250,364 | B2 * | 2/2022 | Beznos | G06F 18/23 |
| 11,250,515 | B1 * | 2/2022 | Feiteira | G06Q 40/08 |
| 11,704,673 | B1 * | 7/2023 | Drapeau | G06N 20/00 705/72 |
| 11,836,803 | B1 * | 12/2023 | Allerkamp | G06F 16/24575 |
| 2010/0094664 | A1 * | 4/2010 | Bush | G06Q 10/10 705/317 |
| 2016/0004979 | A1 * | 1/2016 | Getchius | G06N 20/00 706/12 |
| 2016/0012544 | A1 | 1/2016 | Ramaswamy | |
| 2016/0110818 | A1 * | 4/2016 | Shemesh | G06Q 40/08 705/4 |

(Continued)

OTHER PUBLICATIONS

Indukuri, et al., "Similarity Analysis of Patent Claims Using Natural Language Processing Techniques." Published Jan. 2008. 7 pages. Conference on Computational Intelligence and Multimedia Applications, 2007. pp. 169-175. Published by Research Gate. https://www.researchgate.net/publication/4309042_Similarity_Analysis_of_Patent_Claims_Using_Natural_Language_Processing_Techniques.

(Continued)

*Primary Examiner* — Hien L Duong
(74) *Attorney, Agent, or Firm* — Scott S. Dobson

(57) ABSTRACT

In some embodiments, a processor may receive a claim, where the claim relates to an event. The processor may identify characteristics of the claim. The processor may determine, using an AI model, an alert reason based on a similarity of the characteristics of the claim to characteristics of one or more other claims. The processor may generate an alert notification, and the processor may output the alert notification to a user.

18 Claims, 5 Drawing Sheets

200

(56) References Cited

U.S. PATENT DOCUMENTS

| | | | | |
|---|---|---|---|---|
| 2017/0017760 | A1 | 1/2017 | Freese | |
| 2018/0240194 | A1* | 8/2018 | Dong | G06Q 30/0185 |
| 2018/0268489 | A1* | 9/2018 | McDonnell | G06Q 40/08 |
| 2019/0197442 | A1 | 6/2019 | Lu | |
| 2020/0234182 | A1 | 7/2020 | Saadoun | |
| 2020/0394455 | A1* | 12/2020 | Lee | G06N 20/00 |
| 2021/0192455 | A1* | 6/2021 | Larson | G06Q 30/0185 |
| 2021/0201423 | A1* | 7/2021 | Speranza | G06Q 10/10 |
| 2021/0241279 | A1* | 8/2021 | Patten, Jr. | G06N 3/04 |
| 2021/0326992 | A1* | 10/2021 | Leise | G06N 20/00 |
| 2021/0390564 | A1* | 12/2021 | Chibanda | G06Q 10/0635 |
| 2022/0215393 | A1* | 7/2022 | Lenkala | G06Q 20/4015 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Nomoto, et al., "Definition of a similarity measure between cases based on auto/cross-fuzzy thesauri." Published Jun. 21, 2002. 3 pages. Published by Wiley Online Library. (Abstract Only). https://onlinelibrary.wiley.com/doi/epdf/10.1002/scj.1156.

* cited by examiner

COGNITIVE CLAIMS PROCESSING

BACKGROUND

The present disclosure relates generally to the field of automated claims processing, and more specifically to cognitively identifying potential issues with claims.

Although uncommon, issues within claims are something that cause incidents within multiple industries and should be addressed as quickly as possible. Issues with claims may occur when a user attempts to obtain an advantage to which they are not entitled.

SUMMARY

Embodiments of the present disclosure include a method, computer program product, and system for cognitively identifying potential issues with claims.

In some embodiments, a processor may receive a claim, where the claim relates to an event. The processor may identify characteristics of the claim. The processor may determine, using an AI model, an alert reason based on a similarity of the characteristics of the claim to characteristics of one or more other claims. The processor may generate an alert notification, and the processor may output the alert notification to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
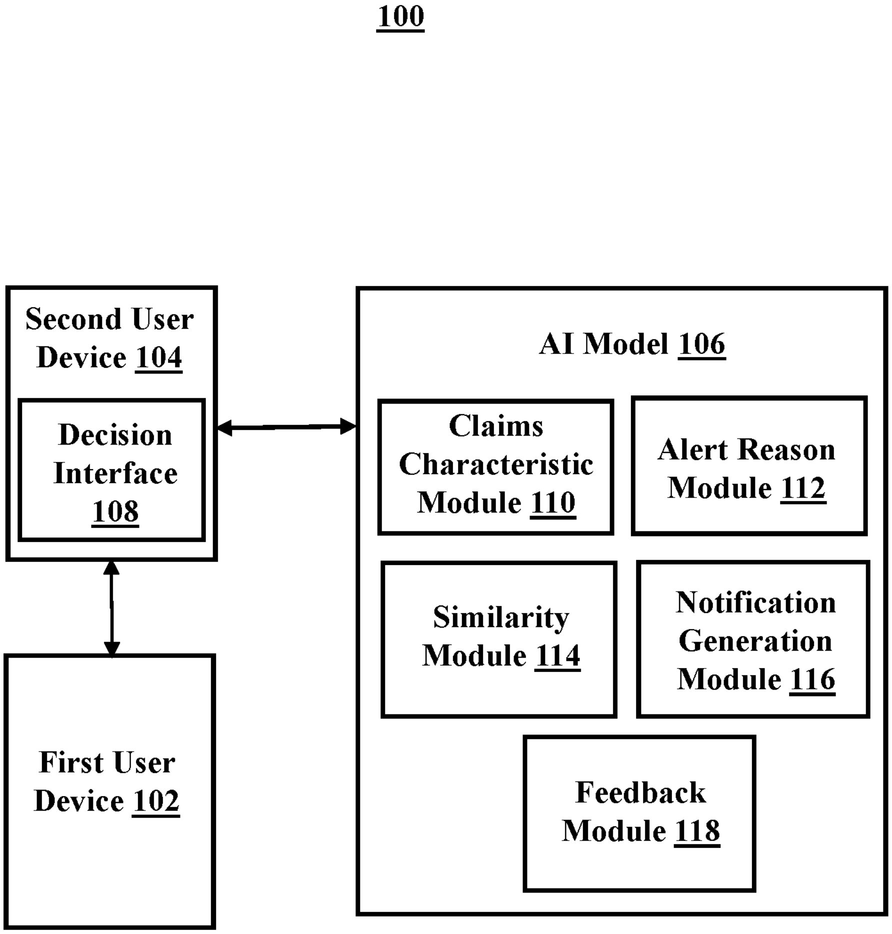
FIG. 1 is a block diagram of an exemplary system for cognitively identifying potential issues with claims, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of automated claims processing, and more specifically to cognitively identifying potential issues with claims. While the present disclosure is not necessarily limited to such applications, various aspects of the disclosure may be appreciated through a discussion of various examples using this context.

In some embodiments, a processor may receive a claim, where the claim is related to an event. In some embodiments, the processor may identify characteristics of the claim. In some embodiments, the event may be an accident. In some embodiments, the characteristics of the claim that are identified may be features or attributes of the claim. For example, the claim may be a claim for recovery submitted for an automobile insurance policy. The features or attributes of the claim may include the type of loss (e.g., collision or theft), type of vehicle (e.g., automobile or motorcycle), number of vehicles involved, location (e.g., in a parking lot or on the highway), identities of people involved (e.g., identity of policy holders, witnesses, attorneys, doctors), etc. In some embodiments, the features of the claim may be extracted using an artificial intelligence ("AI") model. For example, a classification AI model may be utilized to classify claims based on characteristics of the claims. The classification AI model may utilize feature extraction techniques to arrive at a classification that identifies characteristics of the claim.

In some embodiments, the processor may determine, using an AI model, an alert reason based on a similarity of the characteristics of the claim to characteristics of one or more other claims. In some embodiments, the alert reason may be an explanation or justification for flagging the claim as potentially involving an issue (e.g., fraud). In some embodiments, the explanation or justification may provide an insight into or a basis for the concern that the claim may potentially involve an issue. For example, one or more other automobile claims may previously have been identified as potentially fraudulent. The claim in question and the one or more other claims may have a common witness to the accidents who is believed to be providing false accounts of accidents. Using the AI model, an alert reason may be determined for the claim in question (e.g., that the witness for this accident has been flagged as possibly providing false accounts of other accidents).

In some embodiments, the alert reason may be generated using an explanatory AI model. In some embodiments, the alert reason may be determined using a narrative template. For example, three AI models may be utilized to classify different aspects of the claims. A first model may classify risk based on people involved in the claim. A second model may classify the claim based on the language used in the textual explanation of the claim. A third model may classify the claim based on details of the vehicle or details of the damage that occurred to the vehicle. The three models may generate results that each classify the claim in question as possibly involving fraud based on the criteria that the model was trained to classify. An ensemble model may be used to aggregate the results from the three other models. The ensemble model may make a fraud determination and attach a score (e.g., 600-1200, where above 900 is high risk) regarding the risk of fraud.

The alert reason may be generated by using narrative templates for each of the three models that provide an explanation for the reason the claim was classified as involving risk for insurance fraud (e.g., what kind of risk). In some embodiments, an alert reason may be generated using a narrative template that replaces variables with model outputs. For example, a narrative template "Party <Party_Name> playing role of <Role> in the claim is found to be in the <Cluster_Type> cluster containing <Num_Risky_Parties> known risky parties. The variables (e.g., <Party_Name>, <Role>, <Cluster_Type>) may be replaced by outputs of AI models, to generate the alert reason: "Party ABC playing role of CLAIMANT in the claim is found to be in the MEDIUM risk cluster containing 5 known risky parties.

In some embodiments, the processor may generate an alert notification and output the alert notification to a user. The alert notification may identify that the claim in question potentially involves insurance fraud. In some embodiments, the alert notification may identify two or more claims that have been identified as potentially fraudulent. In some embodiments, the two or more claims that have been identified as potentially fraudulent may have the same or similar claim attributes (e.g., characteristics of the claims). In some embodiments, the two or more claims identified as potentially fraudulent may have the same or similar alert reasons.

In some embodiments, the AI model may be trained to generate the alert notification based on a similarity of the claim to other claims based on a combination of the alert reason and the characteristics of the claim. For example, the AI model that generates the alert notification may have received during its training inputs that identified characteristics of the claim (e.g., parties involved, type of vehicle, type of accident) as well as inputs that identified reasons for the alert (e.g., the witness to the accident was previously determined to have a high risk for fraudulent testimony).

In some embodiments, the alert notification output may include a similarity score. In some embodiments, the similarity score may measure how similar the claim in question is to the one or more other claims. The similarity score may be a weighted average and compare one or more claim attributes of the claim in question to the claim attributes of the one or more other claims. The score may compare one or more alert reasons for the claim in question with the alert reasons for the one or more other claims determined to be similar. In some embodiments, the similarity determination may be based on the similarity of claim attributes and the similarity of alert reasons. In some embodiments, the similarity score may be a weighted average of a similarity score for the claim attributes and a similarity score the alert reason.

In some embodiments, generating the alert notification may include identifying that the similarity score exceeds a similarity threshold. For example, based on the similarity of the claim in question to other claims that the AI model has been trained with, the claim in question may get a similarity score of 80 points. An alert notification may be generated when the similarity threshold of 70 points is exceeded. In some embodiments, the similarity threshold may be predetermined. In some embodiments, the similarity threshold may be modified as the AI model is refined with user feedback.

In some embodiments, the alert notification output may include a claim characteristic identifier and an alert reason identifier. In some embodiments, the claim characteristics identifier may indicate a category of claim characteristics that led to generating the alert notification. In some embodiments, the alert reason identifier may indicate a category of alert reasons that led to generating the alert notification. In some embodiments, the claim characteristic identifier may identify to a user the claim attribute of the claim in question that led to the similarity score or similarity determination (e.g., that the claim in question is similar enough to other claims that the AI was trained to classify as potentially involving fraud). In some embodiments, if there are multiple claim attributes that resulted in the similarity score or similarity determination, the claim characteristic identifier may identify the claim attribute that most led to the similarity score or similarity determination. In some embodiments, the claim characteristic identifier may identify two or more claim attributes that most led to the similarity score or similarity determination.

In some embodiments, the alert reason identifier may identify to a user the alert reason for the claim in question that led to the similarity score or similarity determination. In some embodiments, if there are multiple alert reasons that resulted in the similarity score or similarity determination, the alert reason identifier may identify the alert reason that most led to the similarity score or similarity determination. In some embodiments, the alert reason identifier may identify the two or more alert reasons that most led to the similarity score or similarity determination.

For example, the claim in question may have six claim attributes that are considered by the AI model. The AI model may determine that the fifth claim attribute is the claim attribute that resulted in a determination that the alert notification is needed. The third and fourth claim attributes may have also influenced the decision to generate an alert notification, but the fifth claim attribute is determined to be the one that most influenced the determination. The claim characteristic identifier may identify this claim attribute (e.g., accident claim involves Mr. Smith as a witness). There may have been two alert reasons that, combined with the claim characteristics, led to the determination of a that the alert warning is needed. The alert reason that most led to the determination that the alert warning is needed may be identified by the alert reason identifier (e.g., accident claim involves a witness who previously gave false testimony).

In some embodiments, the processor may receive feedback from the user confirming the alert notification. In some embodiments, the processor may update the AI model with the feedback, where the feedback increases an accuracy of subsequent alert notifications. For example, the user may be a case manager who is involved in or oversees identification of potentially fraudulent claims. Based on the judgement and experience of the case manager, the case manager may make a determination that confirms or denies the alert notification for the case. The determination from the case manager may then be provided back to the AI model for refinement of the classifications of the AI model. In some embodiments, where the alert notification identified two or more claim as potentially fraudulent, feedback may be received about two or more claims.

Referring now to FIG. 1, a block diagram of a network 100 for cognitive claims processing is illustrated. Network 100 includes a first user device 102 (e.g., tablet, computer, smartphone, etc.), a second user device 104 (e.g., tablet, computer, smartphone, etc.), and an AI model 106. In some embodiments, the first user device 102 and the second user device 104 may be any computing devices that contain a processor configured to perform one or more of the functions or steps described in this disclosure.

In some embodiments, a processor of the second user device 104 receives a claim from the first user device 102. The second user device 104 provides the claim to the AI model 106. The claims characteristics module 110 of the AI model 106 identifies characteristics or attributes of the claim. The alert reason module 112 of the AI module 106 determines an alert reason for the claim by comparing the claim received to other claims that the AI model 106 was trained to classify. An alert reason is determined by the alert reason module 112 based on the similarity of the characteristics of the claim to characteristics of one or more other claims that were used to train the AI model 106. The similarity module 114 is used to determine a similarity a score for the comparison of the claim to other claims that the AI model 106 was trained to classify. The similarity module 114 may also be utilized to determine if the similarity score for the claim exceeds a similarity threshold. If the similarity score exceeds a threshold, the notification generation module 116 may be used to generate an alert notification and output the alert notification to a user. The alert notification may include the similarity score for the claim, a claim characteristic identifier that identifies the claim characteristic that is the basis for the similarity score, and an alert reason identifier that identifies the alert reason that is the basis for the similarity score. The alert notification may be communicated to the second user device 104 where the user of the second user device 104 provides feedback via the decision interface 108 confirming the alert notification. The confirmation (or denial) from the user may be utilized by the feedback module 118 of the AI model 106 to refine the ability of the AI model to identify claim characteristics, determine alert reasons, determine the similarity between claims, and generate an alert notification that includes a similarity score, a claim characteristic identifier, and an alert reason identifier.

Figure 2:
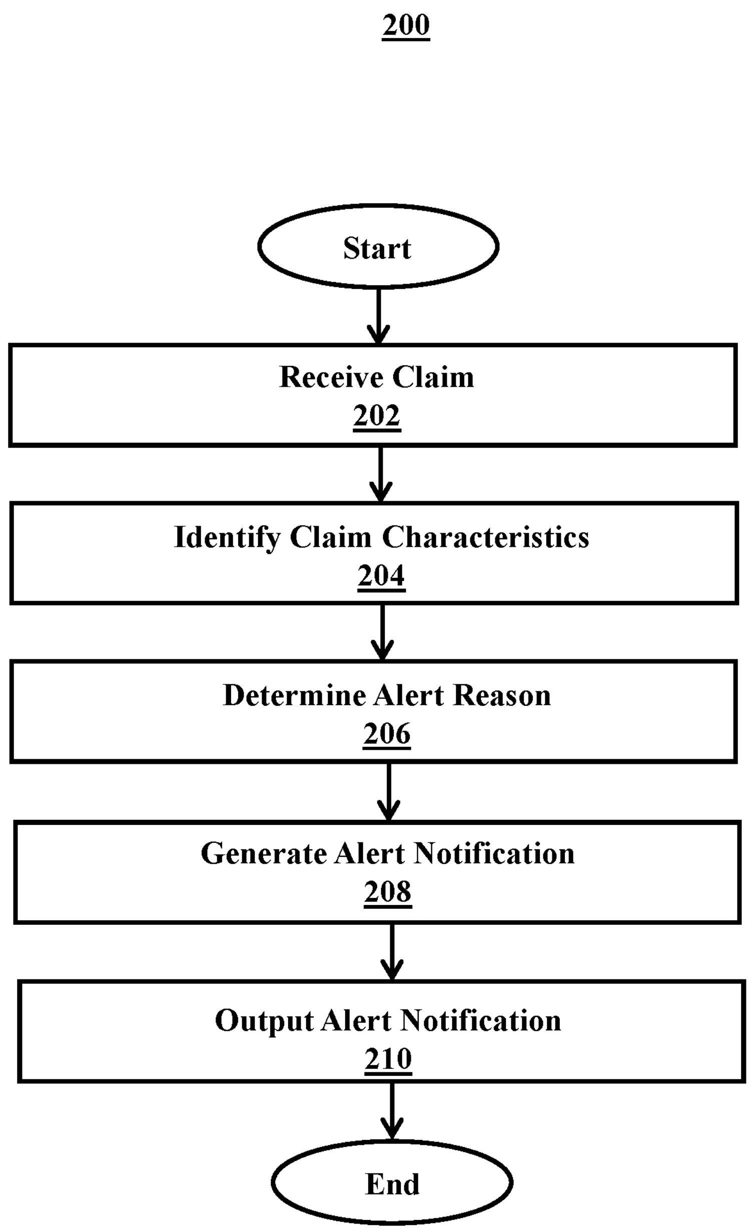
FIG. 2 is a flowchart of an exemplary method system for cognitively identifying potential issues with claims, in accordance with aspects of the present disclosure.

Referring now to FIG. 2, illustrated is a flowchart of an exemplary method 200 for cognitive claims processing, in accordance with embodiments of the present disclosure. In some embodiments, a processor of a system may perform the operations of method 200. In some embodiments, method 200 begins at operation 202. At operation 202, the processor receives a claim. In some embodiments, method 200 proceeds to operation 204, where the processor identifies characteristics of the claim. In some embodiments, method 200 proceeds to operation 206. At operation 206, the processor determines, using an AI model, an alert reason based on a similarity of the characteristics of the claim to characteristics of one or more other claims. In some embodiments, method 200 proceeds to operation 208. At operation 208, the processor generates an alert notification. In some embodiments, method 200 proceeds to operation 210. At operation 210, the processor outputs the alert notification to a user.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
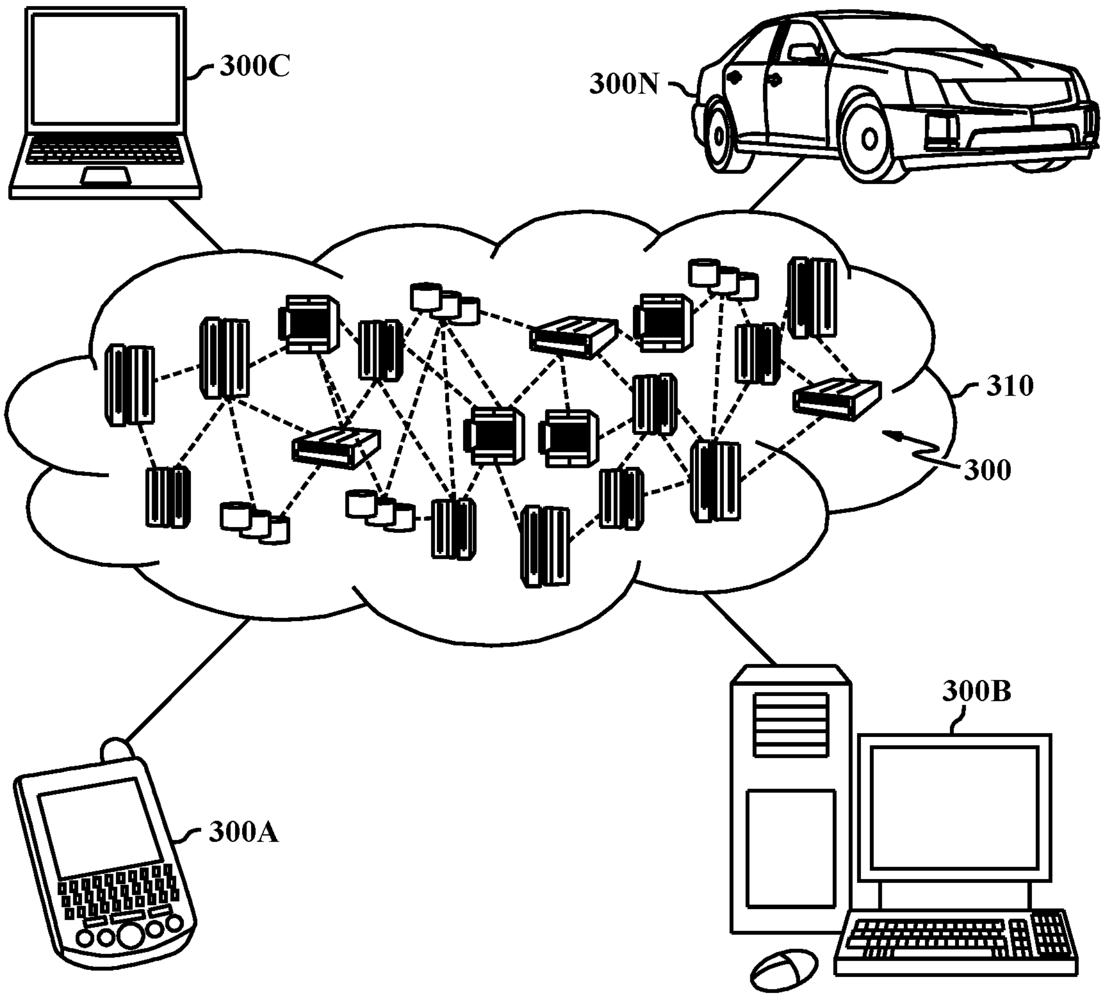
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
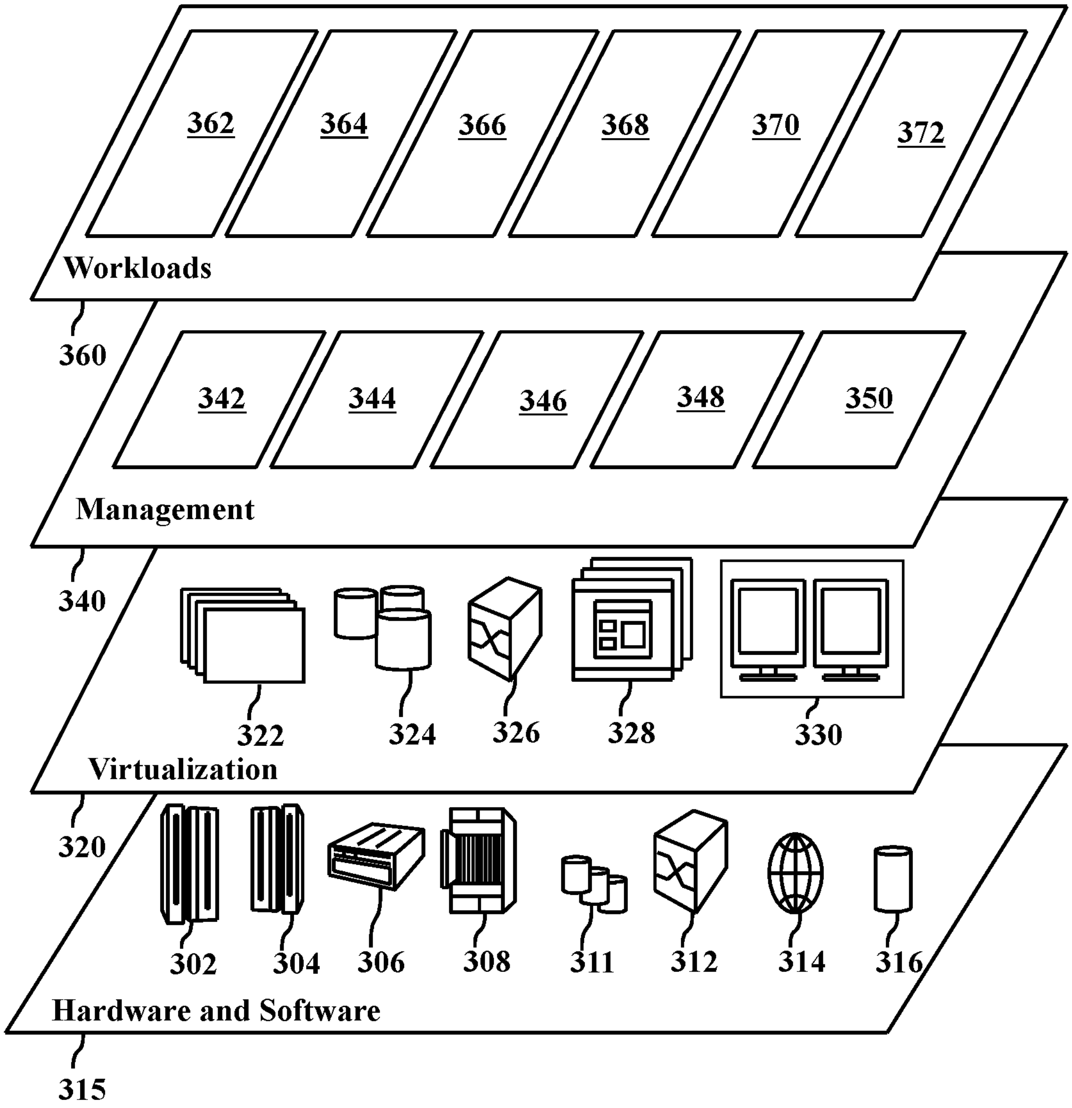
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and cognitive claims processing 372.

Figure 4:
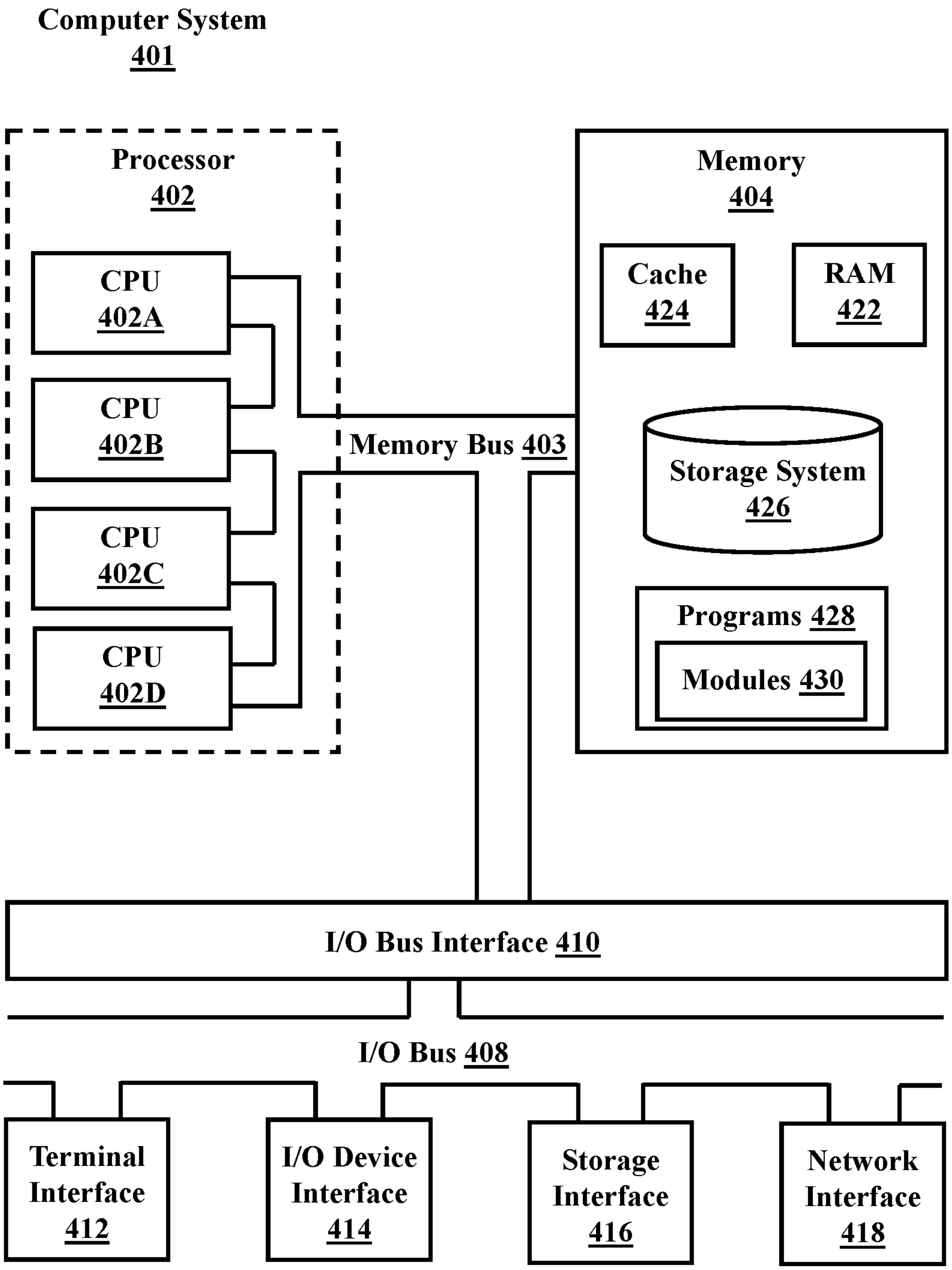
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

receiving, by a processor, a claim, wherein the claim is related to an event;

identifying characteristics of the claim;

determining, using a plurality of artificial intelligence (AI) models trained on a plurality of previous claims, respective ones of the previous claims having a set of characteristics, an alert reason based on a similarity of the characteristics of the claim to characteristics of one or more previous claims of the plurality of previous claims, wherein the plurality of AI models comprises a first AI model and a second AI model that are each configured to generate a classification for a different aspect of the claim, and wherein the plurality of AI models further comprises an ensemble model configured to aggregate classifications from the first and second AI models;

generating an alert notification;

outputting the alert notification to a user;

receiving feedback from the user confirming the alert notification; and updating the first AI model from the plurality of AI models with the feedback, wherein the feedback increases an accuracy of subsequent alert notifications.

2. The method of claim 1, wherein the plurality of AI models are trained to generate the alert notification based on a similarity of the claim to other claims based on a combination of the alert reason and the characteristics of the claim.

3. The method of claim 1, wherein the alert notification output includes a similarity score, wherein the similarity score measures the similarity of the claim to one or more of the previous claims.

4. The method of claim 3, wherein the alert notification output includes a claim characteristics identifier and an alert reason identifier, wherein the claim characteristics identifier indicates a category of claim characteristics that led to generating the alert notification and the alert reason identifier indicates a category of alert reasons that led to generating the alert notification.

5. The method of claim 3, wherein generating the alert notification includes identifying that the similarity score exceeds a similarity threshold.

6. The method of claim 1, wherein the plurality of AI models includes:

an AI model configured to classify a first risk of the claim based on an individual associated with the claim within the claim characteristics;

an AI model configured to classify a second risk of the claim based on text within a textual explanation of the claim within the claim characteristics;

an AI model configured to classify a third risk of the claim based on details of a vehicle associated with the claim within the claim characteristics; and the ensemble model configured to aggregate the first, second, and third classified risks.

7. The method of claim 6, wherein the ensemble model calculates a risk score for the claim based on aggregating the first, second, and third classified risks.

8. The method of claim 1, wherein the alert reason is output according to a narrative template that replaces variables with model outputs.

9. A system comprising:

a memory; and a processor in communication with the memory, the processor being configured to perform operations comprising:

receiving a claim, wherein the claim is related to an event;

identifying characteristics of the claim;

determining, using a plurality of artificial intelligence (AI) models trained on a plurality of previous claims, respective ones of the previous claims having a set of characteristics, an alert reason based on a similarity of the characteristics of the claim to characteristics of one or more previous claims of the plurality of previous claims, wherein the plurality of AI models comprises a first AI model and a second AI model that are each configured to generate a classification for a different aspect of the claim, and wherein the plurality of AI models further comprises an ensemble model configured to aggregate classifications from the first and second AI models;

generating an alert notification;

outputting the alert notification to a user;

receiving feedback from the user confirming the alert notification; and updating the first AI model from the plurality of AI models with the feedback, wherein the feedback increases an accuracy of subsequent alert notifications.

10. The system of claim 9, wherein the plurality of AI models are trained to generate the alert notification based on a similarity of the claim to other claims based on a combination of the alert reason and the characteristics of the claim.

11. The system of claim 9, wherein the alert notification output includes a similarity score, wherein the similarity score measures the similarity of the claim to one or more of the previous claims.

12. The system of claim 11, wherein the alert notification output includes a claim characteristics identifier and an alert reason identifier, wherein the claim characteristics identifier indicates a category of claim characteristics that led to generating the alert notification and the alert reason identifier indicates a category of alert reasons that led to generating the alert notification.

13. The system of claim 11, wherein generating the alert notification includes identifying that the similarity score exceeds a similarity threshold.

14. A computer program product comprising a computer readable storage medium having program instructions embodied therewith, the program instructions executable by a processor to cause the processor to perform operations, the operations comprising:

receiving a claim, wherein the claim is related to an event;

identifying characteristics of the claim;

determining, using a plurality of artificial intelligence (AI) models trained on a plurality of previous claims, respective ones of the previous claims having a set of characteristics, an alert reason based on a similarity of the characteristics of the claim to characteristics of one or more previous claims of the plurality of previous claims, wherein the plurality of AI models comprises a first AI model and a second AI model that are each configured to generate a classification for a different aspect of the claim, and wherein the plurality of AI models further comprises an ensemble model configured to aggregate classifications from the first and second AI models;

generating an alert notification;

outputting the alert notification to a user;

receiving feedback from the user confirming the alert notification; and updating the first AI model from the plurality of AI models with the feedback, wherein the feedback increases an accuracy of subsequent alert notifications.

15. The computer program product of claim 14, wherein the plurality of AI models are trained to generate the alert notification based on a similarity of the claim to other claims based on a combination of the alert reason and the characteristics of the claim.

16. The computer program product of claim 14, wherein the alert notification output includes a similarity score, wherein the similarity score measures the similarity of the claim to one or more of the previous claims.

17. The computer program product of claim 16, wherein the alert notification output includes a claim characteristics identifier and an alert reason identifier, wherein the claim characteristics identifier indicates a category of claim characteristics that led to generating the alert notification and the alert reason identifier indicates a category of alert reasons that led to generating the alert notification.

18. The computer program product of claim 16, wherein generating the alert notification includes identifying that the similarity score exceeds a similarity threshold.

* * * * *